United States Patent
Loce et al.

(10) Patent No.: US 6,643,030 B1
(45) Date of Patent: Nov. 4, 2003

(54) QUANTIZATION METHOD FOR COLOR DOCUMENT REPRODUCTION IN A COLOR PRINTING SYSTEM

(75) Inventors: Robert P. Loce, Webster, NY (US); Xiaoxue Cheng, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/464,517

(22) Filed: Dec. 15, 1999

(51) Int. Cl.[7] .............................. H04N 1/48; H04N 1/58
(52) U.S. Cl. ................... 358/1.9; 358/3.26; 358/533; 358/536
(58) Field of Search ................... 358/1.9, 3.26, 358/533, 536, 534, 535, 3.14, 3.2, 515

(56) References Cited

U.S. PATENT DOCUMENTS

| 4,149,194 A | 4/1979 | Holladay |
| 5,014,123 A | 5/1991 | Imoto |
| 5,067,025 A * | 11/1991 | Kitagawa .................... 358/3.26 |
| 5,107,331 A * | 4/1992 | Collell et al. ................ 358/536 |
| 5,107,349 A * | 4/1992 | Ng et al. .................... 358/3.13 |
| 5,394,252 A | 2/1995 | Holladay et al. |
| 5,471,543 A * | 11/1995 | Ng et al. .................... 358/3.14 |
| 5,740,334 A | 4/1998 | Lin et al. |
| 5,778,091 A * | 7/1998 | Shibazaki et al. .......... 358/536 |
| 5,892,891 A | 4/1999 | Dalal et al. |
| 6,307,645 B1 * | 10/2001 | Mantell et al. ............... 358/1.9 |

OTHER PUBLICATIONS

Yule, "Principles of Color Reproduction", 1967; pp. 282–304.

* cited by examiner

Primary Examiner—Scott Rogers
(74) Attorney, Agent, or Firm—Mark Costello (57) ABSTRACT

The present invention is a method and apparatus for reducing two-color moiré often found during the rendering of full color images using halftoning techniques, by providing shared screen angles between distinct color separations.

36 Claims, 5 Drawing Sheets

QUANTIZATION METHOD FOR COLOR DOCUMENT REPRODUCTION IN A COLOR PRINTING SYSTEM

This invention relates generally to halftoning for reproduction of color documents, and more particularly to a method of maintaining the angles of each separation at a preferred difference.

BACKGROUND OF THE INVENTION

Full color in printed documents is the result of rendering, in combination, a limited set of marking colors over a small area, in densities selected to integrate to a desired color response. This rendering is accomplished in many printing devices by reproducing separations of the image, where each separation provides a single primary color of varying density. When combined together with other color separations, the result is a full color image.

In the digital reproduction of documents, a color separation is conveniently represented as a monochromatic bitmap, which may be described as an electronic image with discrete image signals (hereinafter, pixels) defined by position and density. The density of a color at any particular pixel position is represented as one of a number of possible states or levels. When more than two levels of density are used in the description of the image, the levels are often termed "gray", indicating that they range between a maximum level and minimum level, and without reference to their actual color. Most printing systems have the ability to output or render an image with a small number of levels, typically two, although more output levels are possible. Common input devices including document scanners, digital cameras and computer image generators, however, are capable of describing an image with a substantially larger number of gray levels e.g., 256 levels is common, although larger and smaller numbers of levels are also possible. An image initially described with a large set of levels typically must be describable using a smaller set of levels, in a manner that captures the intent of the user, in order to allow rendering of the image as a hardcopy output. In digital printing of color documents this is accomplished by reducing the relatively large number of input levels in a color separation to a smaller number of output levels. The multiple color separations are then combined together at printing, for example in an image-on-image printing system, to yield the final color print. Commonly, color documents are formed using cyan, magenta, yellow and black colorants although alternative or other combinations of colorants may also be used.

In printing color documents, obtaining the desired density of a particular color is accomplished by halftoning, where separation density variation is represented by marking greater or fewer numbers of ON pixels (binary) in a distinct area of a separation. In a halftoning method known as dithering, or screening, a value representing the density of each color separation pixel of an array of separation pixels within the area is compared to one of a set of preselected thresholds (i.e., stored as a dither matrix). The repetitive output pattern generated by this comparison is considered a halftone cell as taught, for example, in U.S. Pat. No. 4,149,194 to Holladay. The effect of such an arrangement is that for an area where the image density of the color separation lies between the maximum and minimum levels, some of the thresholds within the dither matrix will be exceeded while others will not. In the binary case, the separation pixels or cell elements for which the thresholds are exceeded might be printed as a maximum colorant value, while the remaining separation pixels are allowed to remain white, dependent on the actual physical quantity described by the data.

While widely accepted as a method for rendering color prints of digital images, dithering creates problems where the repeating pattern of the screen, when superposed over similar repeating patterns in the multiple color separations, can cause moiré or other artifacts.

Holladay et al., U.S. Pat. No. 5,394,252, teaches that there are 2-way moiré patterns between the color separations, but that the angles are often chosen to maximize the frequency of the moirés, resulting in the "rosettes" noted in magnified color halftones. This is true of both analog (photographic) and digital systems. However, Holladay et al. ('252) is directed to the interaction of the three most perceptible colors, cyan, magenta and black, and to the elimination of three-color moiré amongst such colors using a non-periodic screen. Holladay et al. further notes that error diffusion, because it operates on a pixel-by-pixel basis is non-periodic, mitigating the problems of moiré. Along these same lines, U.S. Pat. No. 5,740,334 to Lin et al. teaches that using a stochastically screened yellow separation will have a minimum effect on the image.

U.S. Pat. No. 4,149,194 to Holladay, assigned to the assignee of the present invention, discloses that the angle of the halftone screen can be changed to generate screen patterns which do not strongly beat visually against each other, thereby reducing the objectionable moiré. Noted as particularly critical are the angles between the most prominent colors, cyan, magenta and black. A typical arrangement of rotated screen angles is 90° (or 0°), 15°, 45°, and 75° for cyan, yellow, magenta, and black (C,M,Y,K) respectively. However, even at these angles, moiré is a problem.

U.S. Pat. No. 5,892,891 to Dalal et al. and assigned to the assignee of the present invention, discloses that in a "hi-fi" color printing system, wherein colorants of hi-fi colors beyond the regular CMYK primary colorants are available, a main gamut obtainable with the CMYK colorants only is mutually exclusive with at least one extended gamut in which a hi-fi colorant is used and a complementary one of the CMY colorants is excluded. Because the main and extended gamuts are mutually exclusive, no more than four colorants are used in any part of the image, and no more than four halftone screens need be used to obtain any desired color. Thus, mutually exclusive gamut colorants may use the same separation screen angle.

The references discussed herein and above are incorporated by reference for their teachings.

SUMMARY OF THE INVENTION

In accordance with the present invention, there is provided a method of halftoning four color images for reproduction in a color printer, wherein three preferred halftone screen angles are provided, and a first separation causing limited moiré is printed at a same screen angle as a second separation, when the density of said second separation is relatively low.

In accordance with another aspect of the present invention, the described halftoning method is used in conjunction with a color printer in which gray component replacement is used.

In accordance with still another aspect of the invention, prior to implementing the above-described screen angle share, a suitability determination is made, to determine whether the image is suitable for use of the technique. In addition, even if suitable, a blending check and operation is desirable, to avoid undesired artifacts in the use of this process.

In accordance with yet another aspect of the invention, in a color reproduction device, reproducing images in at least four color separations, each color separation printed with a screen at a selected screen angle, a method of sharing screen angles between distinct color separations including: for a received image, determining image segment suitability for separation screen angle sharing; for an image determined to be suitable, for a particular image component, determining separations that will share screen angles; and processing said image component with shared screen angles.

In accordance with still another aspect of the invention, there is provided a four color printer, printing superposed separations with cyan magenta, yellow and black separations, each separation including at least a portion thereof halftoned, a method of sharing screen angles between distinct color separations including from said cyan, magenta and black separations, determining for a selected area one of said separations with a minimum density; printing cyan, magenta and black separations with halftones at widely separated screen angles; and printing said yellow separation at a same screen angle at a same screen angle as said separation with said minimum density.

The invention takes advantage of the fact that all four colorants normally used in color reproduction are rarely present in the same localized image region. In such an arrangement, the separation having the least significant impact on moiré generation can share a screen angle used by a separation having a greater impact on moiré. In practice, many localized image regions do not possess high levels of C, M, Y and K signals simultaneously, which provides an opportunity to use another color's screen angle adaptively for the Y signal instead of the traditional 90° screen. As an example, yellow separation data can be adaptively placed at any open separation screen angle. Thus, a preferred screen angle of 30 degrees between separations can be maintained throughout most of the image.

The present invention will be described in connection with a preferred embodiment; however, it will be understood that there is no intent to limit the invention to the embodiment described. On the contrary, the intent is to cover all alternatives, modifications, and equivalents as may be included within the spirit and scope of the invention as defined by the appended claims.

Figure 1:
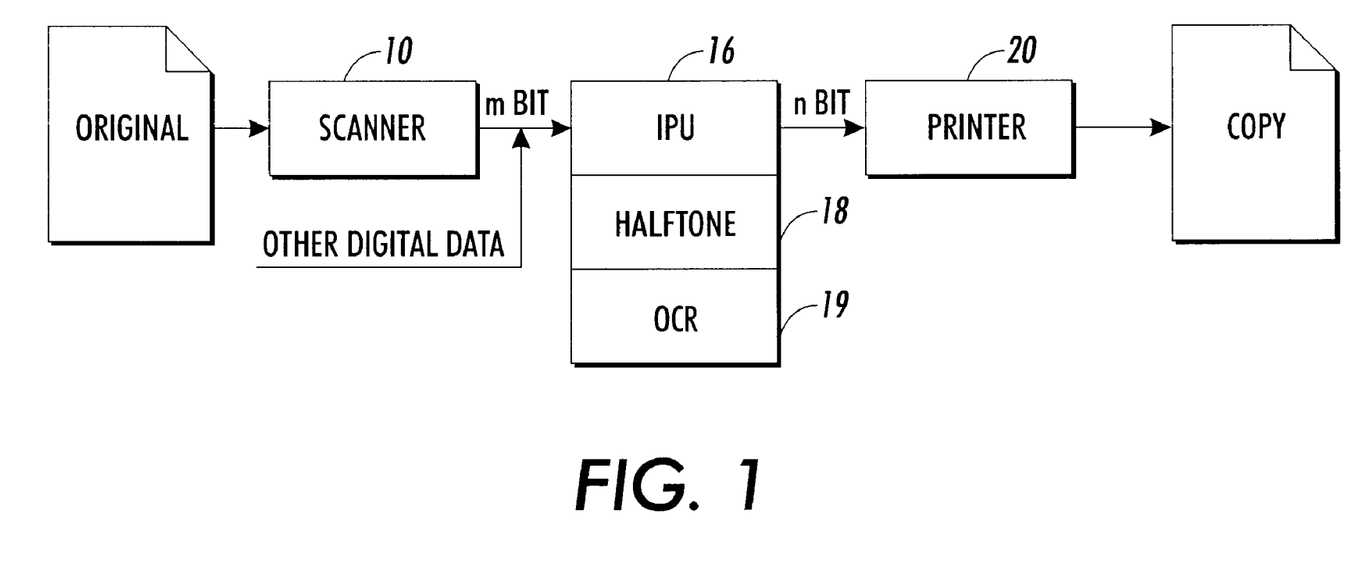
FIG. 1 is a data flow diagram depicting the flow of data in an image processing system and an associated digital printing system in which the present invention may find particular use.

Referring now to the drawings where the showings are for the purpose of describing an embodiment of the invention and not for limiting same, a basic image processing system is shown in FIG. 1, in which a document is prepared for printing. In the present case, "gray" image data may be characterized as image signals, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer.

As used herein, the term "dot" refers to a product or an image resulting from a screening process. A "screen cell", as used herein, refers to the set of pixels which together will form the dot, while the term "screen matrix" will be used to describe the set of values which together make up the set of thresholds to be applied. A "pixel" refers to an image signal associated with a particular position in an image, having a density between white and black. Accordingly, pixels are defined by intensity and position. A dot is made up of a plurality of pixels. While printers print pixels (sometimes referred to as "spots"), halftoning methods tend to consider the pixels together as a dot. These terms are used for simplification and it should be understood that the appropriate sizing operations have to be performed for images where the input resolution in terms of scan pixels is different from the output resolution in terms of print pixels. A "localized image region" is an area that would integrate to give the impression of local color, hence its size is on the order of a halftone cell. It differs from an "image segment", which denotes at least a portion of an image to be processed.

In the particular color system to be discussed, color documents are represented by multiple sets of image signals, each set (or separation) represented by an independent channel, which is usually processed independently, although, as will be described, context may be considered. A "color image" as used herein is therefore a document including at least two separations, and commonly three or four separations, and sometimes more than 4 separations (commonly referred to as "hi-fi" color). One possible digital copier (a scanner/printer combination) is described for example, in U.S. Pat. No. 5,014,123 to Imoto, incorporated herein by reference. Each separation provides a set of image signals that will drive a printer to produce one color of the image. In the case of multicolor printers, the separations superposed together form the color image. In this context, we will describe pixels as discrete image signals, which represent optical density of the document image in a given small area thereof. The term "pixel" will be used to refer to such an image signal in each separation, as distinguished from "color pixel", which is the sum of the color densities of corresponding pixels in each separation. "Gray", as used herein does not refer to a color unless specifically identified as such. Rather, the term refers to image signals that range between maximum and minimum, irrespective of the color of the separation in which the signals are used.

Figure 2:
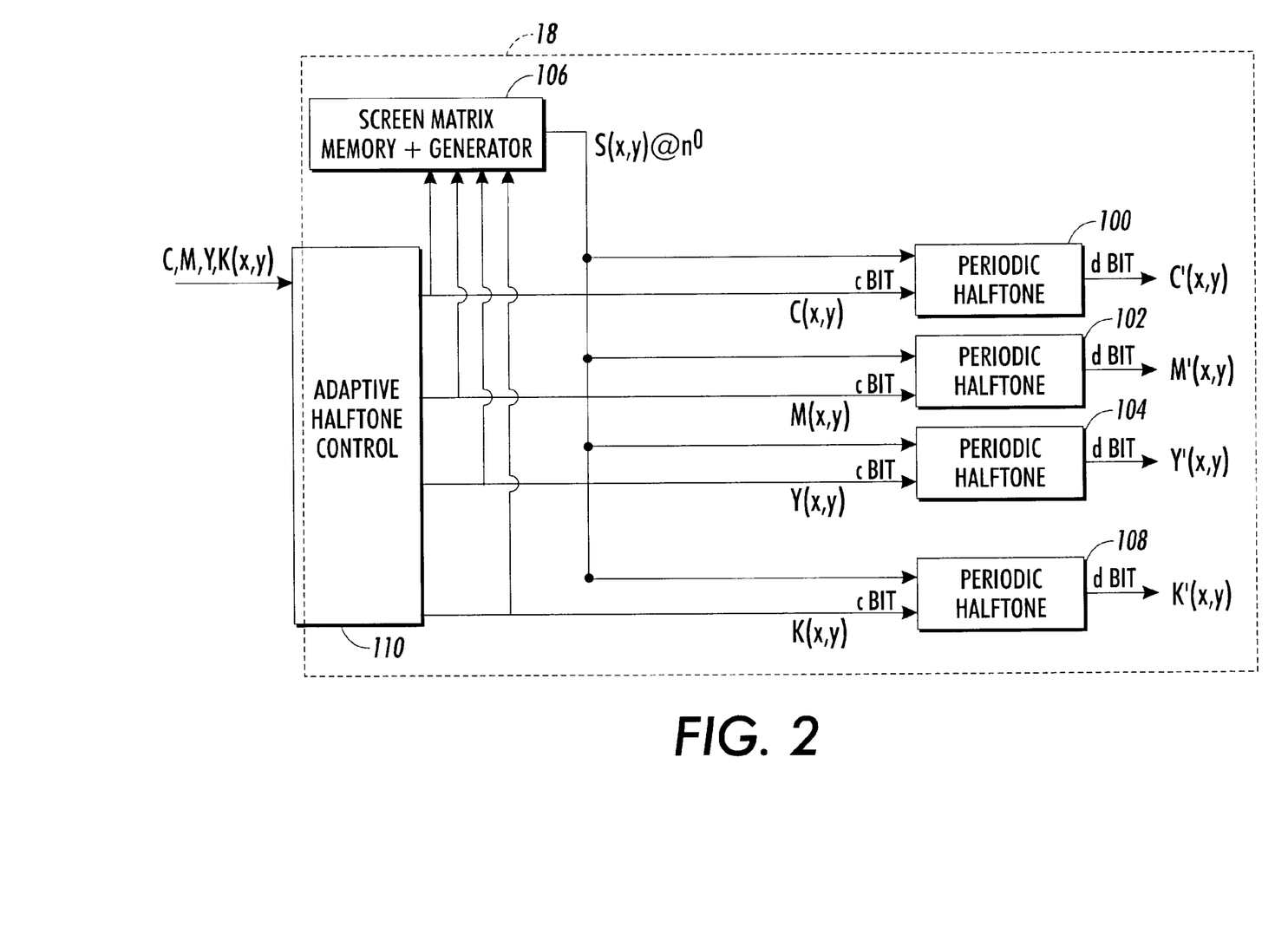
FIG. 2 is a schematic illustration of the components of a halftoning circuit in which the present invention may be implemented.

With reference now to FIG. 1, which shows a general system requirement representing the goal of the invention, an electronic representation of a document (hereinafter, an image) from image input terminal such as scanner 10 derives electronic digital data in some manner, in a format related to the physical characteristics of the device, and commonly with pixels defined at "c" levels. Common color scanners produce 8 bit/pixel data per color, at spatial resolutions acceptable for many purposes. Other methods of producing similar data include cameras or stored images, or computer-generated images from programmed computers. Since this is a color document, the image is defined with two or more separation bitmaps, usually with identical resolution and pixel depth. The electronic image signals are directed through an image processing unit (IPU) 16 to be processed so that an image suitable for reproduction on image output terminal or printer 20 is obtained. Image processing unit 16 commonly includes a halftone module 18 that converts c-level digital image signals to d-level digital image signals, suitable for driving a particular printer, where m and n are integer values. An under-color-removal module 19 may also be provided, which reduces amounts of colorants used to represent images, while maintaining color appearance. Associated with a gray-component-replacement module may be a black addition (K+) module (not shown), which causes black to be added to an image, in accordance with a designated scheme. When we discuss gray component replacement, we encompass undercolor removal, which comprehends the case of removal of neutral colors created by the combination of colorants FIG. 2 shows the halftone module 18 operational characteristics. Four separations, C(x,y), M(x,y), Y(x,y), K(x,y), obtained, are each processed for halftoning purposes to reduce an c-level input to an d-level output, where x and y represent two-dimensional position on a page. In accordance with the invention, cyan, magenta, yellow, and black separations are processed with a screening method, preferably with rotated screens at periodic halftone processors 100, 102, 104 and 108. These are periodic halftone processors, using screen matrices stored in screen matrix memory or generator 106, which, for a given gray level, reproduce a periodic dot pattern. We say that this is a "memory" or "generator" because it is possible to have stored screen values, or generate screen values on the fly, or combine stored values with a screen generation routine. In any case, device 106 produces the screens required for our purposes.

While screening may be described for simplicity as the addition of a set of selected screen values to image signals within a defined area of the image, in conjunction with a uniform application of a threshold level(s) to the combined values, it will be understood that the process of screening may also be represented by a set of varying thresholds defined at locations corresponding to pixels over a given area of the image. A screen cell is generally smaller than the total image and will be replicated in a predetermined scheme for processing the image in order to cover an area of the image. A method for an efficient representation of variable or rotated angle screen cells by a screen matrix and a corresponding replication scheme is given in U.S. Pat. No. 4,149,194 to Holladay. The output of a process using a screen cell is a set of pixels, defined by a set of levels having a number of members less than the input set of values. Commonly, the set of d-level output values is binary, either black or white, or a spot or no spot, although the values might be gray. The binary output of a single halftone cell is a set of pixels that are either black or white, which together form a "dot". The periodic halftone processors 100, 102, 104 and 106 receive "c"-level data and return "d"-level data representing the separation.

In accordance with the invention, the adaptive use of one of the CMYK screen angles for Y on a pixel-by-pixel or region-by-region (or segment-by-segment) basis is provided. Initially, criteria can be applied to the image to determine if it is suitable for this sort of adaptive screening, at adaptive halftoning control 110. This functionality can be included in hardware, or in a programmed microprocessor or other logic arrangement. In one possible implementation, C, M, Y, K (x, y) are processed and tags are created to turn on or off adaptive halftoning. Thus, in FIG. 2, adaptive halftoning directs each separation to a halftone processor, and also directs the screen matrix memory (with tagged data) to direct an appropriate screen to each halftone processor Adaptive halftoning control 110 operates to determine the suitability of using a C, M or K screen angle for Y (the "Adaptive Y" halftoning process). Once an image is determined to be suitable, a determination must be made as which screen angle to use at each pixel. Finally, the various screen angles must be applied to the image. Generally, a process within the terms of the invention can be outlined as follows:

1. Test the image for suitability for Adaptive Y screening
2. Determine the adaptive screens to be used for each pixel or region
3. Apply the adaptive screens.

Figure 3:
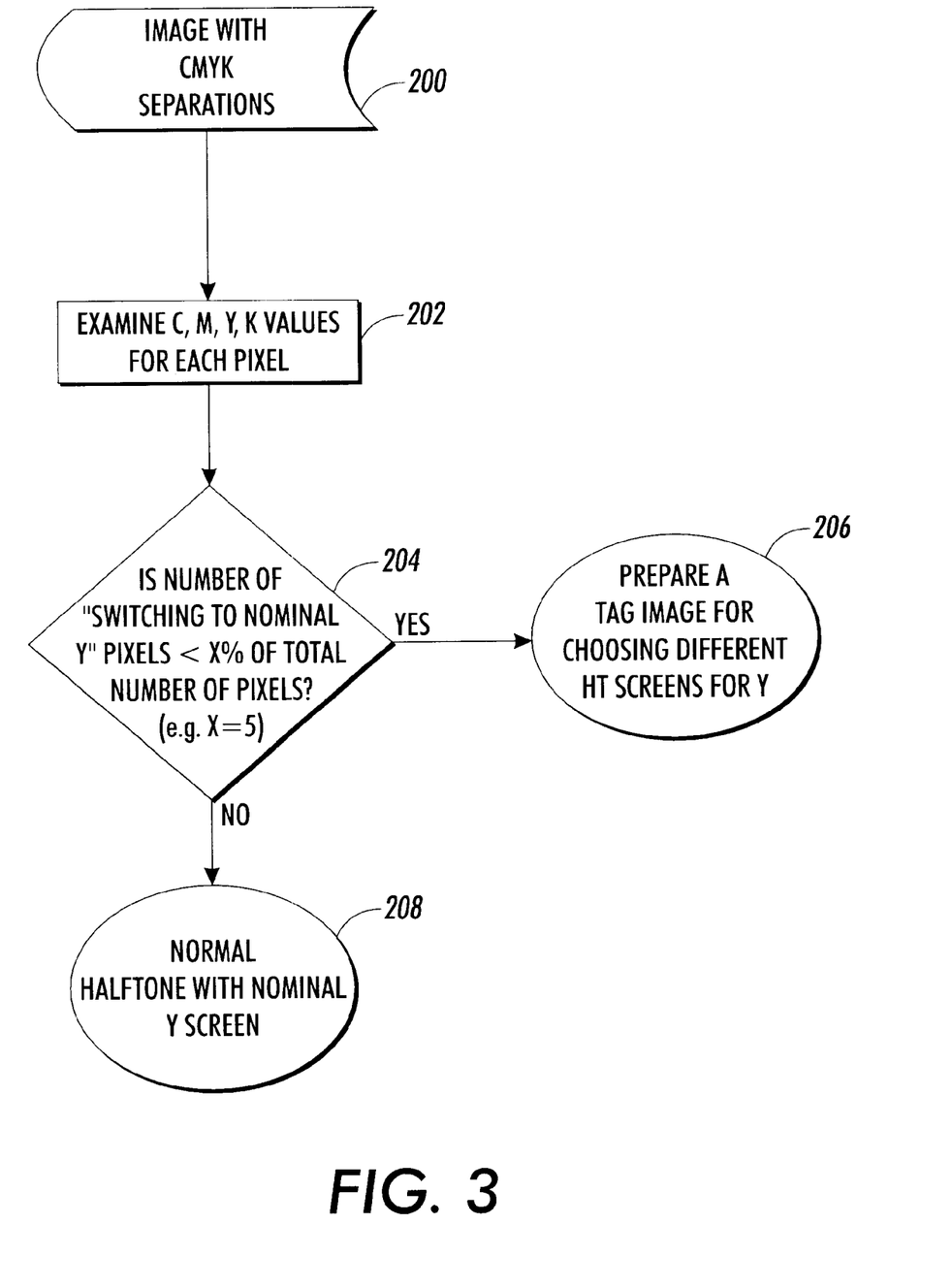
FIG. 3 illustrates a qualification process, determining whether an image segment is appropriate for use of the adaptive screen angle method.

With reference now to FIG. 3, a suitability determination is provided to initially determine whether Adaptive Y screening is desirable. There are certain pixel values that require employing the nominal Y screen. When a given pixel in an image possesses values for C, M, and K that are all reasonably large (say, >15%) it may not be appropriate to use a C, M or K halftone angle for screening Y for that pixel. Screening Y with a C, M, or K screen angle in that case may yield the problems associated with dot-on-dot halftoning (misregistration sensitivity).

Further, we have found that switching to the nominal Y screen from an adaptively chosen C, M, or K, screen angle for these pixels produces a border between a no-moiré state (C, M, or K screen used) and a moiré state (nominal Y screen used). That border appears objectionable. To avoid the problem of switching to the nominal Y screen within an image, we apply a test to determine if a significant number of such switches do occur. If a significant number does not occur, we apply the Adaptive Y halftoning process.

Note that other criteria could be added to the test, such as spatial orientation of the switches, tests for certain colors, tests for certain image types, image objects, or the like. Alternatively, the feature of adaptive screening can simply be chosen or not chosen by a user based on his knowledge of the image. Note that an aggressive GCR strategy may extend the use of the present invention to a broader range of images. Of course, color mapping strategies could be designed to work with the halftoning process. GCR and color mapping strategies could be used to modify pixel values to preferable possess values that are low in at least one of C, M, Y, or K.

Referring to FIG. 3, we show a method for testing an image or image segment for suitability for Adaptive Y screening. Initially we look at the image with CMYK separations (Step 200). The values for each pixel are examined (step 202). Adaptive Y is best used when at least one of the C, M or K separations possess relatively small density values (say, less than a threshold set at 15% of the maximum pixel value). Otherwise, standard halftoning should be used. A decision is made at step 204, as to how often a change between standard halftoning and Adaptive Y halftoning would be necessary. Experience with real images shows that the changeover is somewhat noticeable if it occurs with high frequency. If the number of changes over a selected area is small, Adaptive Y halftoning will be turned on at step 206. Otherwise, standard halftoning will be maintained at step 208.

Of course, suitability may also be determined by a user intervention, such as through a computer or printer user interface. In such case, irrespective of any image-based determination, the screen angle sharing process will be applied. It may also occur that, for a particular printer, screen angle sharing works better for particular separations rather than others. The selection and suitability tests can be weighted to accommodate such preferences.

Figure 4:
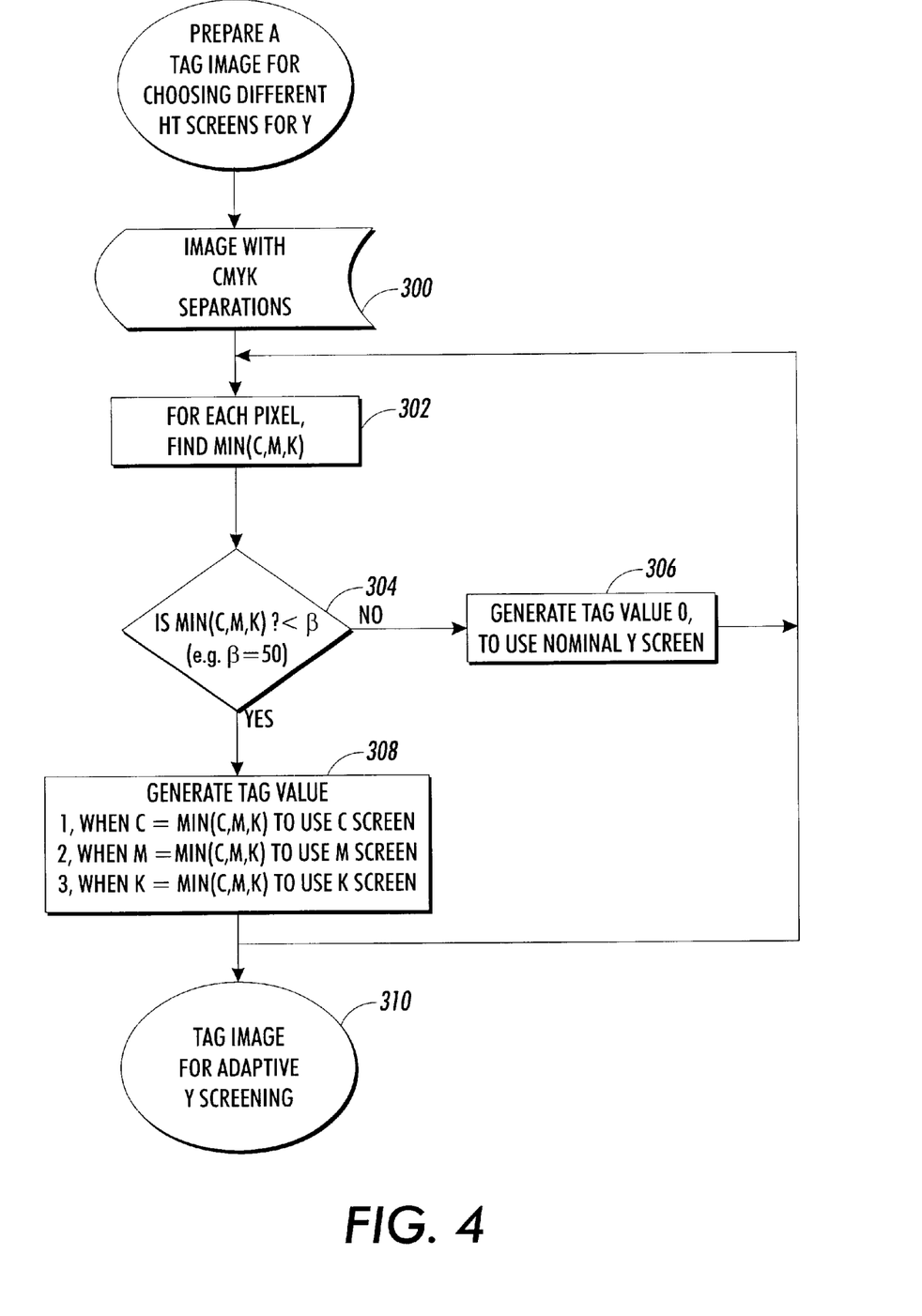
FIG. 4, illustrates a determination process, in which the screens that will share screen angles are determined.

Referring now to FIG. 4, the process for determining the adaptive screen to be used for each pixel or region is described. It is contemplated that a data tag, or tag bits will be added to each pixel or perhaps a larger object, independent of the image received describing how the pixel or object should be halftoned. This tag could be read by the screen matrix memory or generator 106, instructing it as to the screen to be produced for any particular pixel or object. The advantage of using data tags in such a context is that the data tags themselves can be operated on to improve screen angle sharing results.

At step 300, we look again at the image with CMYK separations. At step 302, we find the minimum of the C, M and K separations, min(C,M,K). At step 304, we determine whether min(C, M, K) is less than some particular reference value $\beta$, indicating relatively low density. In the particular example illustrated, we have selected $\beta$=50, in an 8 bit (256 gray level) system. If $\beta$ is not less than 50, a tag value indicating that standard halftoning should be used is generated at step 306.

Note that the min operation could be taken on a pixel-by-pixel basis or could incorporate spatial information, such as min over a region, or averaged over a region. Also, note that pixel signals may be processed prior to the min operation. For instance, a multiplicative coefficient or additive term may be applied. Such preprocessing can weight the likelihood of switches to particular angles, allowing preferential sharing among selected screens rather than all screens. If for instance, it was not desirable to switch to the K angle, there is an equivalent result if one incorporates that decision into the processing algorithm, or if one applies a large additive term to the K pixel signal prior to the min operation. Such distinctions are well within the present invention.

Spatial considerations could influence the weighting described. For instance, when processing a given pixel nearby switches to the K angle, that proximity may make the K angle more desirable for the given pixel so that transition artifacts are avoided. The proximity of nearby switches, such as to K, could apply a coefficient to the K pixel signal prior to the min operation, where that coefficient enables preferential selection of the K angle via the min operation. In practice, coefficients less than 1 or negative additive terms could be used to increase the likelihood of a particular angle and those values could be chosen based on the screen angles chosen for neighboring pixels. Note that equivalently we could choose to suppress the selection of certain screen angles for converse reasons.

If min(C, M, K) is less than a reference value $\beta$, then a tag value is generated at step 308. The tag value is representative of the screen that should be used for yellow. For example, if the minimum value of min(C, M, K) is the cyan separation, then the cyan screen angle will be used for yellow. If the minimum value of min(C, M, K) is the magenta separation, then the magenta screen angle will be used for yellow. If the minimum value of min(C, M, K) is the black separation, then the black screen angle will be used for yellow. At step 310, the image pixel or object or region is tagged for handling.

Finally, and returning to FIG. 2, we apply the results, which are to use the adaptive screen results in the halftoning process. After determining that Adaptive Y halftoning is a desirable process, and further determining which screen angle to use, adaptive halftoning module 110 tags a pixel or object or region. The tag is read by the screen matrix memory or generator 106, and an appropriate halftone screen value or set of values is returned. If, for any particular pixel, object or region, Adaptive Y is desired, the screen matrix values directed to halftone processor 104 reflect a screen angle from one of the other screens.

An alternative to the min operation described above is a threshold operation to determine which angles may be candidates for final selection. If several colorants have suitable low values, each of their respective angles could be a candidate for selection via additional criteria. For instance, in a green region there may be very little K or M colorants. The angle from either separation could yield a region free of moiré. In this case we may chose an angle that yielded a preferred transition from a neighboring region. For example, if that neighboring region was blue, which is composed primarily of magenta and cyan, the two regions both possess low levels of black colorant. Choosing the K angle for the Y screen would avoid potential switching texture artifacts in the transition between the neighboring regions.

In certain circumstances it can be desirable to modify the generated screen angle tags after a sufficient spatial collection of such tags have been generated. For instance, if it was found that switching occurred according to a particular spatial configuration it may be desirable to modify the switch decision. An example of such a situation is a switch to particular angle for an isolated pixel within a region of pixels that will all use a different angle. To achieve a more pleasing texture one may choose to change the tag of the isolated pixel to possess the tag value of the region. Such tag map, or segmentation map, clean-up based on spatial consideration is performed in other areas of image processing and it has been found that morphological operations such as opening and closing can produce the desired results.

It is important to note that the present invention details a method of sharing screen angles. However, the same screen matrix is not required, i.e., different screens may be used for different colors. Additionally, the screens need not be in phase—one screen can be out of phase with the screen with which it is sharing a screen angle.

In accordance with another aspect of the invention, gray component replacement processing can enhance the usage of Adaptive Y halftoning. Gray component removal refers to removal of gray being produced by combinations of colorants. Black replacement may be provided. If gray component replacement is used aggressively, the values for at least one of cyan, magenta, or yellow are likely to be small enough to use Adaptive Y halftoning more frequently. Gray component replacement is well understood and described in Yule, *Principles of Color Reproduction*, Wiley & Sons, NY, 1967, pp. 282–304.

Figure 5:
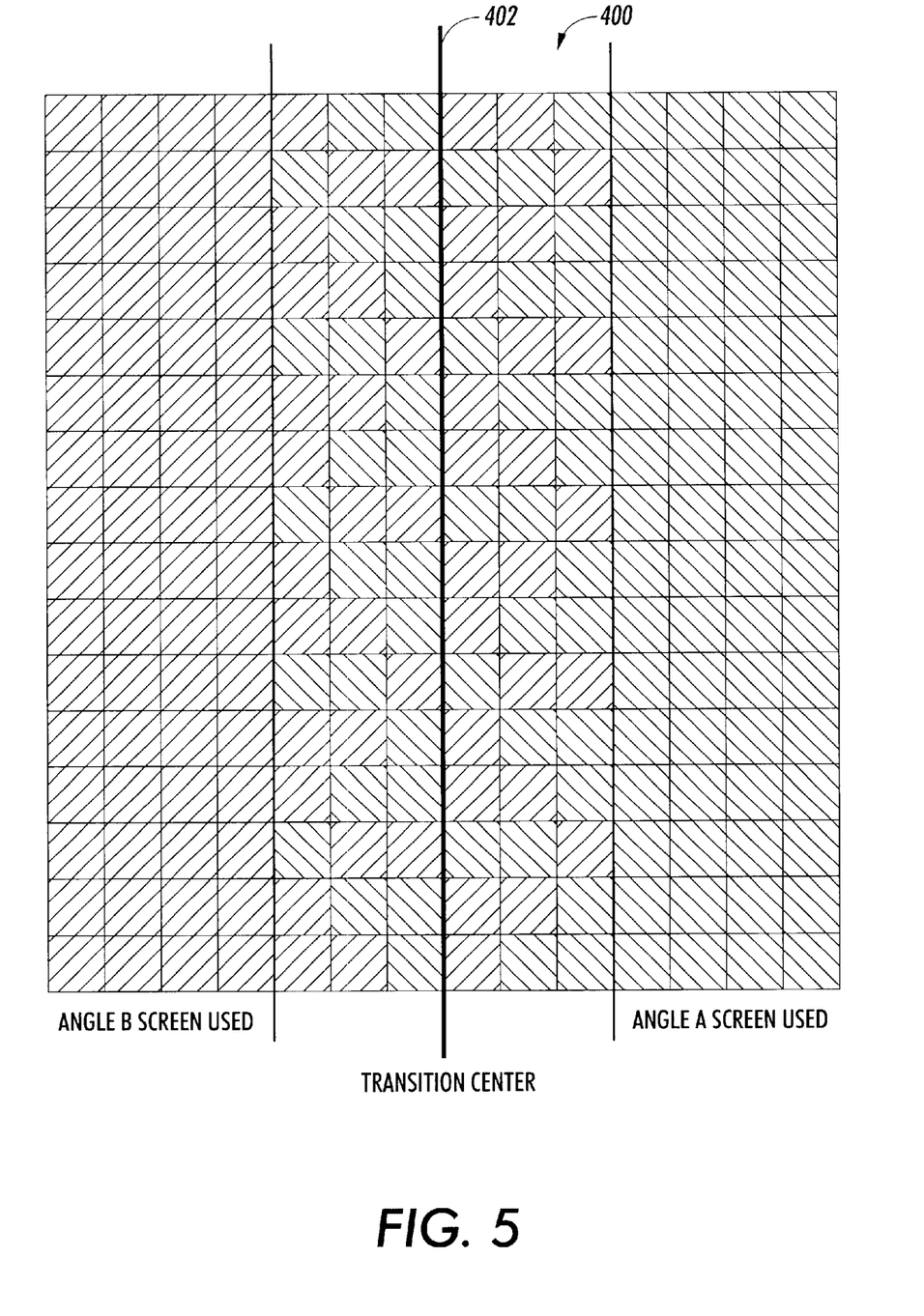
FIG. 5 represents the blending process, mitigating artifacts at screen angle sharing mode changeovers.

With reference to FIG. 5, for certain image types, image color transitions, of spatial configurations of angle switching it has been found that a controlled transition from one screen angle ("Angle B") to another ("Angle A") is desirable to avoid sudden texture changes. One control strategy employs blending the two screens or screen angles of concern in the transition. An example of blending angles that has been found to be beneficial is the random or patterned alternation between the two angles in a predefined transition zone 400. Pixels farther from the center 402 of the transition zone would more frequently be assigned the angle on its side of the transition. Alternatively, the halftone screens could be blended in the transition zone. Over a predefined area, weighted averages of the two screen threshold arrays could be computed. These blended, or averaged, screen thresholds would be applied to the image in the transition zone.

It will be understood by those of skill in the art that the results of some possible tests for suitability may actually constitute operations necessary to use the Adaptive Y halftoning process.

Note that the various tests that determine the screens could be performed on image representations other than digital representations, such as Page-Description Language forms of a document. In such a function, or vector form of an image, the various represented objects would undergo similar tests as would be applied to pixels. Adaptive Y halftoning tags could be applied to the objects, which may be subsequently rendered to digital form and halftoned in a simultaneous process or subsequent process.

It will no doubt be appreciated that the present invention can be accomplished through application software accomplishing the functions described, to operate a digital computer or microprocessor, though a hardware circuit, which will probably provide optimum speed, or through some combination of software and hardware.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. In a color reproduction device, reproducing images in at least four color separations, each color separation printed with a screen at a selected screen angle, a method of sharing screen angles between distinct color separations including:
   for a received image segment, determining suitability for separation screen angle sharing;
   for an image segment determined to be suitable, determining separations that will share screen angles;
   processing said image segment with shared screen angles.

2. A method as defined in claim 1 wherein said at least four color separations include cyan, magenta, yellow and black.

3. A method as defined in claim 1, wherein among separations, at least one separation is a preferred separation for screen angle sharing.

4. A method as defined in claim 1, wherein image segments determined to be suitable sharing screen angles are identified by a data tag, independently of the image received.

5. A method as defined in claim 4, wherein data tags for said image segment are processed to control application of screen sharing.

6. A method as defined in claim 5, wherein said data tag processing includes morphological processing to smooth application of screen angle sharing over said image or said image segment.

7. A method as defined in claim 1, wherein said image segment suitability is determined from a frequency of use of separation screen angle sharing.

8. A method as defined in claim 1, wherein said image segment suitability is determined from an object type to be processed in a received image.

9. A method as defined in claim 1, wherein said image segment suitability is determined by a spatial configuration of screen angles to be shared for a particular region of the received image.

10. A method as defined in claim 1, wherein said image segment suitability is user determined, via a user interface.

11. A method as defined in claim 1, wherein two separations will share screen angles, one of which will be a yellow separation.

12. A method as defined in claim 1, wherein for two image segments, at least one of which is determined to be suitable for screen angle sharing, a blending process is applied, mixing each image segments screen angle sharing over a border between.

13. A method as defined in claim 1, wherein said determination of separations that will share screen angles includes
   identifying a yellow separation;
   from among a cyan, magenta and black separation, determining which separation has a lowest density;
   identifying said separation with a lowest density as a separation suitable for sharing screen angles, with said yellow separation.

14. A method as defined in claim 13, wherein said identifying suitability for sharing screen angles is provided by a data tag, independent of the image received.

15. A method as defined in claim 14, wherein data tags for said image segment are processed to control application of screen sharing.

16. A method as defined in claim 15, wherein said data tag processing includes morphological processing to smooth application of screen sharing over said image or said image segment.

17. A method as defined in claim 1, wherein prior to said image suitability determination, gray color replacement is applied, whereby density of at least one separation other than yellow is substantially reduced.

18. A method as defined in claim 1, wherein separations sharing screen angles are each reproduced with a distinct halftone matrix.

19. A method as defined in claim 1, wherein separations sharing screen angles are reproduced with halftone cells therein out of phase with each other.

20. A method as defined in claim 1, wherein said determination of separations that will share screen angles includes
   identifying a yellow separation;
   from among a cyan, magenta and black separation, determining which separations have a density less than a predetermined threshold;
   identifying a separation with a density less than a predetermined threshold as suitable for sharing screen angles, with said yellow separation.

21. A method as defined in claim 20, wherein signals in said identified separations are identified by a data tag, independent of the image received.

22. A method as defined in claim 20, wherein data tag signals in said image segment are processed to control application of screen sharing.

23. A method as defined in claim 22, wherein said processing included comparison of characteristics of a spatial distribution of said tags, for selection of a screen for screen sharing.

24. A method as defined in claim 22, wherein said data tag processing includes morphological processing to smooth application of screen sharing over said image or said image segment.

25. A method as defined in claim 20, wherein among separations, at least one separation is a preferred separation for screen angle sharing.

26. A method as defined in claim 25, wherein thresholding, said at least one preferred separation is weighted to favor selection in selection processing.

27. A four color printer, printing superposed separations with cyan, magenta, yellow and black separations, each separation including at least a portion thereof halftoned, a method of sharing screen angles between distinct color separations including     from said cyan, magenta and black separations, determining for a selected area one of said separations with a minimum density;

printing cyan, magenta and black separations with halftones at widely separated screen angles;

printing said yellow separation at a same screen angle as said separation with said minimum density.

28. A method as defined in claim 27, where prior to said image suitability determination, gray color replacement is applied, whereby density of at least one separation other than yellow is substantially reduced.

29. A method as defined in claim 27, wherein separations sharing screen angles are each reproduced with a distinct halftone matrix.

30. A method as defined in claim 27, wherein separations sharing screen angles are reproduced with halftone cells therein out of phases with each other.

31. A halftoning system, for use in a reproduction device printing a plurality of separations comprising:

a separation input, receiving said plurality of separations for printing, each separation representing a distinct printer colorant, and including a plurality of image signals described as "c"-level signals;

a plurality of halftone processors, quantizing image signals received in said separations into "d"-level signals, where d<c, suitable for reproduction at said reproduction device, each halftone processor responsive to a screen matrix having a predetermined screen angle and phase, directed thereto for said quantizing process;

a screen generator, providing screen matrices at selected screen angles and selected phases to each halftone processor;

an adaptive halftone controller, controlling operation of said halftone processors, by providing commands to said screen generator regarding screen matrices, screen angles and/or phases;

said adaptive halftone controller operative to direct said halftone screen generator to direct screen matrices with identical screen angles to a first and a second halftone processor in said plurality thereof, when density within a selected set of said image signals in said separation quantized by said first halftone processor is less than a predetermined value.

32. A device as defined in claim 31, wherein said predetermined value is greater than 0.

33. A device as defined in claim 31, wherein said plurality of separations include cyan, magenta, yellow and black separations, and said second halftone process processes said yellow separation.

34. A device as defined in claim 31, wherein said first halftone process processes one of said cyan, magenta and black separations.

35. A device as defined in claim 31, wherein said separations received at said separation input have been previously subjected to gray component removal.

36. A device as defined in claim 31, wherein said adaptive controller adds at least one control bit for said screen matrix generator, identifying which halftone processors should be provided with screen matrices with identical screen angles.

* * * * *